United States Patent
Arnold et al.

(10) Patent No.: US 11,841,259 B2
(45) Date of Patent: Dec. 12, 2023

(54) PARAMETERIZATION OF A FIELD DEVICE

(71) Applicant: Endress+Hauser SE+Co. KG, Maulburg (DE)

(72) Inventors: Michèle Arnold, Hedingen (CH); Gerd Bechtel, Steinen (DE); Franco Ferraro, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 61 days.

(21) Appl. No.: 17/256,424

(22) PCT Filed: May 23, 2019

(86) PCT No.: PCT/EP2019/063408
§ 371 (c)(1),
(2) Date: Dec. 28, 2020

(87) PCT Pub. No.: WO2020/001874
PCT Pub. Date: Jan. 2, 2020

(65) Prior Publication Data
US 2021/0270658 A1 Sep. 2, 2021

(30) Foreign Application Priority Data
Jun. 26, 2018 (DE) ...................... 10 2018 115 368.6

(51) Int. Cl.
*G01F 23/00* (2022.01)
*G01F 23/80* (2022.01)

(52) U.S. Cl.
CPC .......... *G01F 23/0007* (2013.01); *G01F 23/80* (2022.01)

(58) Field of Classification Search
CPC .. G01F 23/0007; G01F 23/80; G01F 23/2967; G01F 23/265; G01F 25/20
See application file for complete search history.

(56) References Cited

U.S. PATENT DOCUMENTS

| 5,895,848 A | 4/1999 | Wilson et al. |
| 2011/0226054 A1 | 9/2011 | Sears et al. |
| 2019/0186980 A1* | 6/2019 | Sears ...................... G01F 15/02 |

FOREIGN PATENT DOCUMENTS

| DE | 10057974 A1 | 5/2002 |
| GB | 2552685 A | 2/2018 |

* cited by examiner

*Primary Examiner* — Jennifer Bahls
*Assistant Examiner* — Quang X Nguyen
(74) *Attorney, Agent, or Firm* — Mark A. Logan; Endress+Hauser (USA) Holding, Inc.

(57) ABSTRACT

Disclosed is a method for parametering an apparatus for determining and/or monitoring a predeterminable fill level, wherein the apparatus includes a sensor unit and an electronics. The method includes determining an influence interval for a received signal received by the sensor unit as a function of an environmental parameter, determining a first value for the received signal or for a variable derived from the received signal corresponding to a first switch state, determining a second value for the received signal or for a variable derived from the received signal corresponding to a second switch state, and determining a third value for the received signal or for a variable derived from the received signal corresponding to a first switching point based on the first switch state and/or the second switch state and taking into consideration the at least one influence interval.

12 Claims, 3 Drawing Sheets

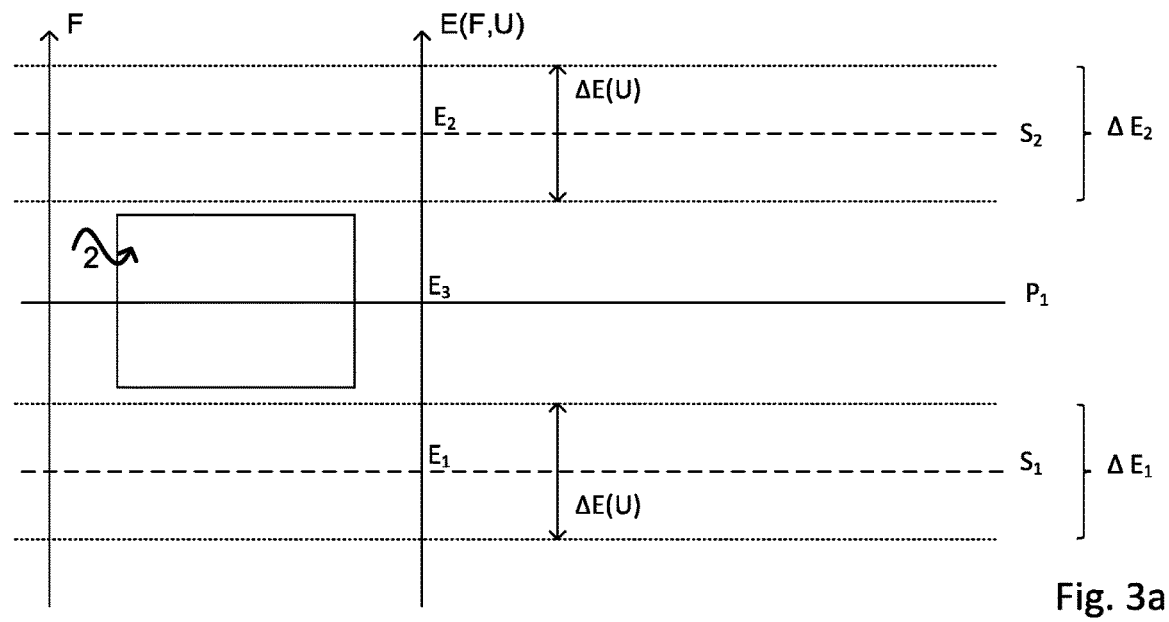
Fig. 3a
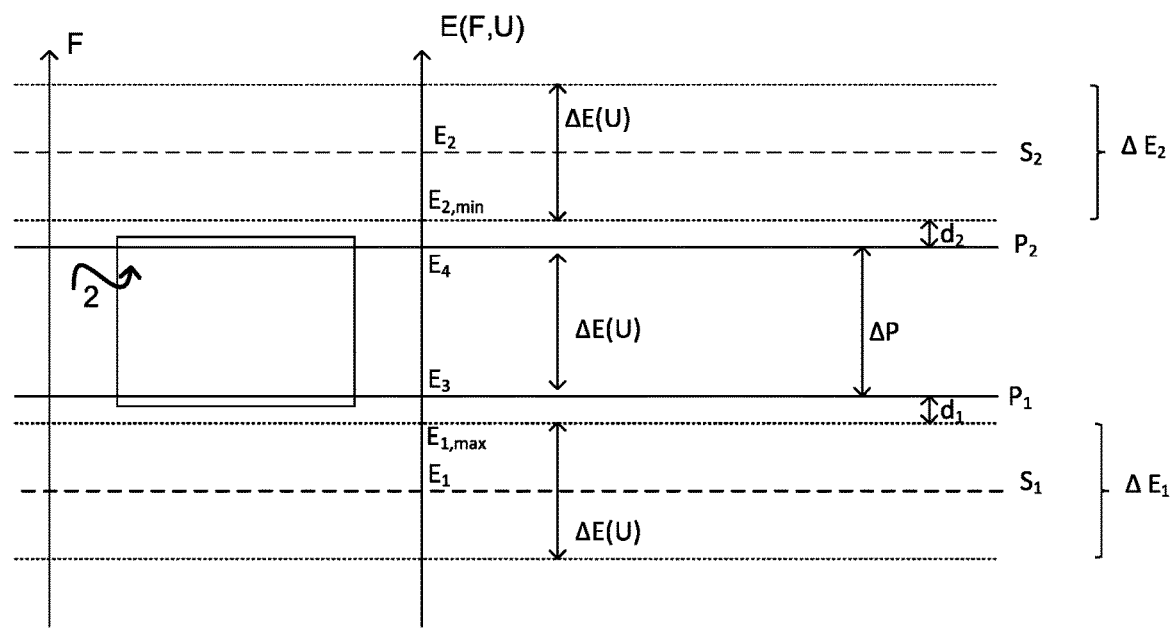
Fig. 3b
Fig. 3

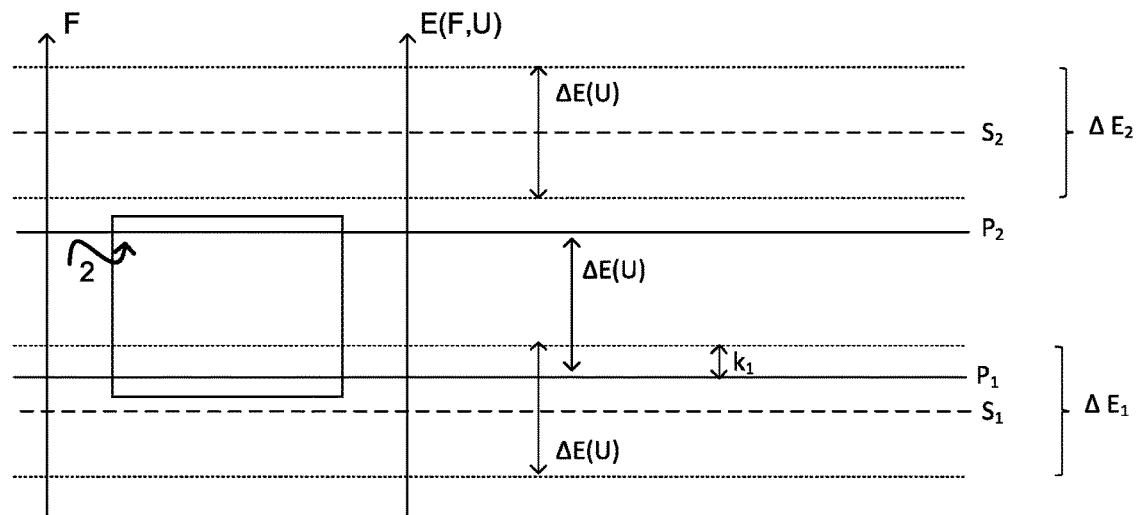
Fig. 4a
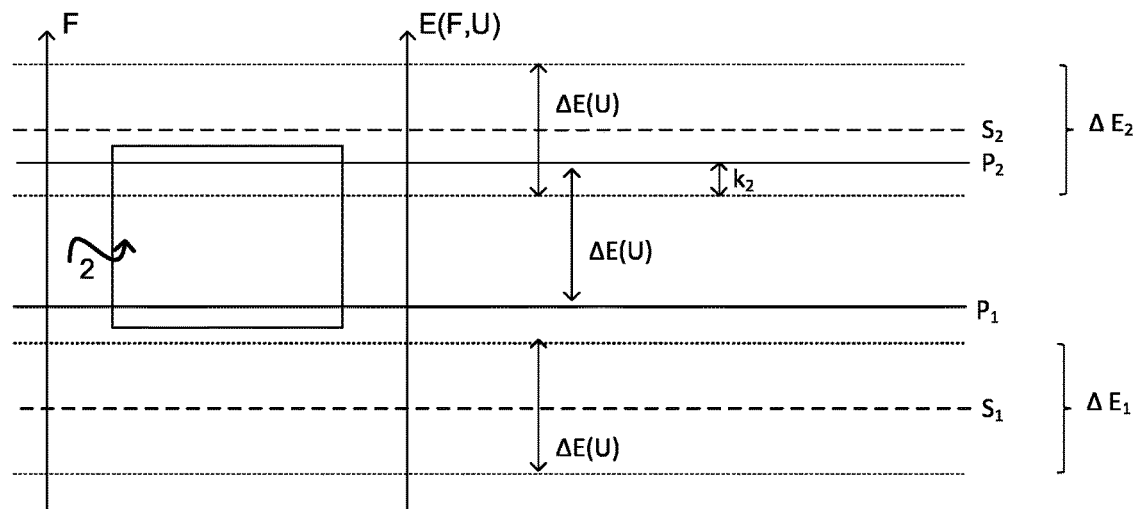
Fig. 4b
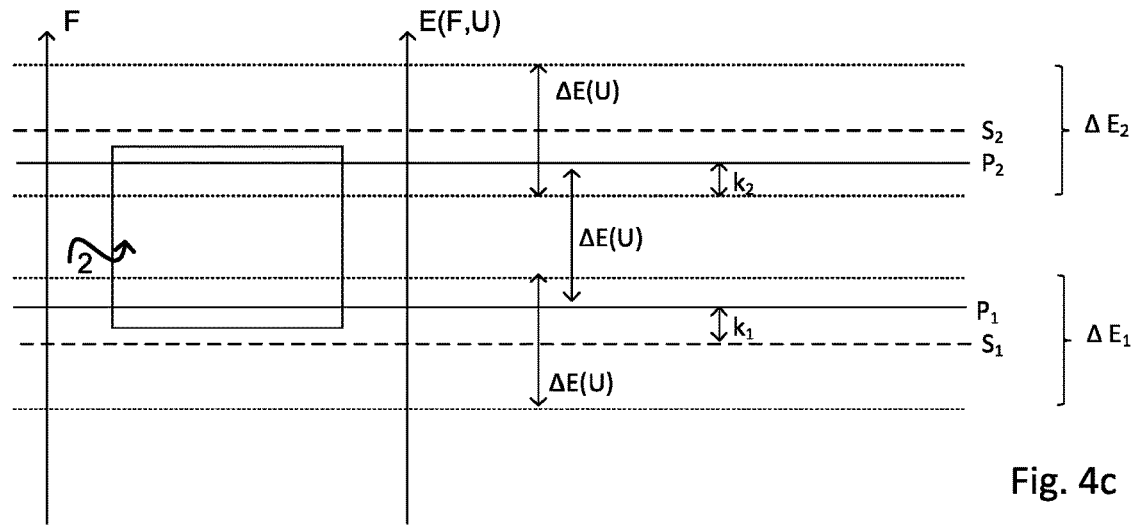
Fig. 4c
Fig. 4

PARAMETERIZATION OF A FIELD DEVICE

CROSS-REFERENCE TO RELATED APPLICATIONS

The present application is related to and claims the priority benefit of German Patent Application No. 10 2018 115 368.6, filed on Jun. 26, 2018 and International Patent Application No. PCT/EP2019/063408, filed on May 23, 2019, the entire contents of which are incorporated herein by reference.

TECHNICAL FIELD

The present invention relates to a method for parametering an apparatus for determining and/or monitoring a predeterminable fill level.

BACKGROUND

Field devices in the form of limit level switches in process and/or automation technology can operate according to the most varied of measuring principles serving for determining and/or monitoring a fill level. These measuring principles are known per se in the state of the art and are, consequently, not discussed here in detail.

Examples of limit level switches for determining and/or monitoring a predeterminable fill level are, for example, vibronic sensors having at least one mechanically oscillatable unit or also capacitive and/or conductive sensors. Corresponding field devices are manufactured by the applicant in great variety and in the case of vibronic fill-level measuring devices sold, for example, under the mark, LIQUIPHANT and/or SOLIPHANT, and in the case of capacitive and/or conductive measuring devices, for example, under the mark, LIQUIPOINT.

In the case of a vibronic limit level switch, for example, it is distinguished, whether the oscillatable unit is covered by the medium or is freely oscillating. These two states, the free state and the covered state, can, in such case, be distinguished, for example, based on different resonance frequencies, thus based on a frequency shift.

In the case of a conductive limit level switch, in contrast, it is detected, whether via a conductive medium an electrical contact is present between a probe electrode and the wall of a conductive container or a second electrode. In the case of a measuring device based on the capacitive measuring principle, in contrast, the fill level is ascertained from the capacitance of the capacitor formed by a probe electrode and the wall of the container or a second electrode. Depending on conductivity of the medium, either the medium or a probe insulation forms the dielectric of the capacitor.

Independently of the utilized measuring principle, in the case of a limit level switch, e.g. an apparatus for determining and/or monitoring a predeterminable fill level, two switch states are distinguished. In a first switch state, the sensor unit is free of medium, while, in a second switch state, it is at least partially covered by the medium. The first switch state and the second switch state correspond, in such case, in each case, to a certain value or value range for the, in each case, received signal received from the sensor unit, or for different variables derived from the received signal and applied for signal processing. These variables can be, for example, a frequency, amplitude or phase of the received signal.

Between the two switch states, at least one switching point is defined. If the received signal or a chosen variable derived therefrom reaches a predeterminable value corresponding to the switching point, then the apparatus switches between the two switch states back and forth. The particular switching point corresponds, in such case, to a predeterminable covering of the sensor unit with the medium. In such case, it can be a complete covering or also a predeterminable, partial covering of the sensor unit with the medium, wherein the sensor unit is usually arranged at a predeterminable position, especially a predeterminable height, on a container wall of a container containing the medium.

Limit level switches are frequently applied in safety-critical applications. A reliable switching between the two switch states of the apparatus is therefore of great importance.

In this regard, known from EP0614519B1 is a vibronic limit level switch, in the case of which the switching point, in the there described case, of a switching frequency, is set as a function of a resonant frequency of the oscillatable unit. The exact position of the resonant frequency of the oscillatable unit varies from sensor to sensor. In order to assure reliable switching of the sensor, the particular switching point must be selected as a function of resonant frequency.

Known from EP01336083B1, in turn, is a vibronic limit level switch, in the case of which disturbance variables for determining the switching point are taken into consideration. In this way, malfunctions of the measuring apparatus are excluded, by which temperature and/or pressure differences might falsely indicate the reaching of the switching point. The various, considered disturbing variables are either directly measured, or characteristic lines or curves are created, which reflect the influence of the disturbing variable on the frequency of the oscillatable unit. In each case, however, the particular disturbing variable must be continuously provided, in order to compensate its influence on the measuring behavior of the vibronic sensor, and, clearly, this involves an increased constructive and metrological effort.

SUMMARY

Starting from the state of the art, an object of the present invention is to provide a method for parametering a limit level switch, which method can be performed in simple manner.

The object is achieved by a method for parametering an apparatus for determining and/or monitoring a predeterminable fill level, which apparatus comprises a sensor unit and an electronics. The method includes method steps as follows:
  determining at least one influence interval for a received signal received by the sensor unit as a function of at least one environmental parameter,
  determining a first value for the received signal or for a variable derived from the received signal corresponding to a first switch state, at which value the sensor unit is located in a first state,
  determining a second value for the received signal or for a variable derived from the received signal corresponding to a second switch state, at which value the sensor unit is located in a second state, and
  determining at least a third value for the received signal or for a variable derived from the received signal corresponding to a first switching point based on the first and/or second switch state and taking into consideration the at least one influence interval.

According to the invention, at least one influence interval is ascertained, which takes into consideration the dependence of the received signal or a variable derived therefrom on at least one environmental parameter. The influence interval can be ascertained, in such case, individually for each measuring device, for example, before start-up of the measuring device. Likewise, it is, however, also an option to ascertain, based on a large number of measuring devices, at least one influence interval, which is then taken into consideration for all measuring devices of a given type.

Parameters of a field device in connection with the present invention are, for example, the two switch states and the at least one switching point. The variables derived from the received signal can be, for example, an amplitude, frequency or phase of the received signal. Which variable to derive from the signal received directly from the sensor unit depends, in such case, among others, on the measuring principle and the particular received signal, which can be, for example, an electrical current or a voltage.

In the context of the present invention, numerous options are available for determining the influence interval. On the one hand, the influence of at least two different environmental parameters on the received signal or the variable derived therefrom can be examined individually and/or together and then a single influence interval can be determined as a function of the at least two environmental parameters. This can be advantageous, for example, when the dependence of the received signal or the variable derived therefrom is similar for the at least two environmental parameters, for example, rests on similar or like functional relationships.

Likewise it is, however, an option, to determine and to take into consideration different influence intervals for different values of the received signal or the variable derived therefrom. This can, again, be advantageous, when a difference between the first and second values of the received signal or the variable derived therefrom is especially large.

Advantageously, an environmental parameter of the invention does not need to be continuously determined or ascertained. Rather, at least one influence interval can be determined once and then be taken into consideration for the ongoing operation. The at least one switching point is, in such case, optimally matched to both switch states and to the at least one influence interval. The determining of the at least one switching point can, in such case, occur at least partially automated. In comparison with the state of the art, the solution of the invention offers a considerable simplification both in structural as well as also in metrological regard. No additional measurements or computer determinations of a value of the environmental parameter are necessary in the ongoing measurement operation.

An embodiment of the method includes that the environmental parameter is temperature, pressure, humidity, density or viscosity. The environmental parameter can refer, on the one hand, to the medium at least partially surrounding the sensor unit and/or surrounding the sensor as a function of time or to the environment surrounding the measuring apparatus outside of the medium.

Advantageously in the context of the method of the invention, the influence intervals lie symmetrically around the first and second switch states, and the first and second values for the received signal or the variable derived therefrom.

The influence interval can extend over a predeterminable value range for an environmental parameter, which corresponds, for example, to the particular field of use for the environmental parameter in the case of operation of the apparatus. For example, there can be specified for the apparatus a certain temperature-, pressure-, humidity-, density- or viscosity range, within which the apparatus can be used. For this value range of the environmental parameter, then the dependence of the received signal of the apparatus or the variable derived from the received signal is ascertained and the influence interval is determined based on the value range for the received signal or the variable derived therefrom. The influence interval describes therewith the variation of the received signal as a function of the environmental parameter.

If the value range for an environmental parameter is known, then the first and second switch states can, for example, be determined at an average value of the value range of the environmental parameter. In this way, the influence interval is automatically arranged symmetrically around the first and second switch states. The influence interval is, thus, in each case, placed symmetrically around the first and second switch states, in that the first and second switch states lie at an average value of the value range of the environmental parameter.

In an especially preferred embodiment, at least a fourth value is determined for the received signal or for a variable derived from the received signal corresponding to a second switching point based on the first and/or second switch state and taking into consideration the at least one influence interval. By determining two switching points, a so-called switching point-hysteresis can be taken into consideration. Understood under switching point-hysteresis, in such case, is a difference between forwards- and backwards switching points. The changing from the first to the second switch state, and from the second to the first switch state, occur correspondingly at two different switching points.

In such case, it is advantageous that the first and/or second switching point(s) are/is determined in such a manner that the third and/or fourth values for the received signal or for the variable derived from the received signal lies/lie between the first and second values for the received signal or the variable derived from the received signal corresponding to the first and second switch states.

Furthermore, it is advantageous that the first and second switching points have a predeterminable switching interval relative to one another, which is given by a magnitude of a difference between the third and fourth values for the received signal or the variable derived from the received signal.

Regarding the switching separation, it is, in turn, advantageous that the predeterminable switching interval be maximized taking into consideration the first and/or second switch state and the influence interval.

It is, furthermore, advantageous that the predeterminable switching interval is selected in such a manner that the switching interval is greater than the influence interval.

By suitable choice of the predeterminable switching separation, it can be taken into consideration that also for such values of the received signal or the variable derived therefrom, the influence of the at least one environmental parameter is taken into consideration, which values lie between first and second values of the received signal or the variable derived therefrom corresponding to the first and second switch states. Corresponding values of the received signal or the variable derived therefrom correspond to different partial coverings of the sensor unit.

Another especially preferred embodiment includes that there is ascertained for the received signal or the variable derived from the received signal based on the at least one influence interval a first and/or second value range, which contain/contains the first and/or second value of the received signal or the variable derived from the received signal, wherein the first and/or second value range(s) correspond/ corresponds to the first and/or second switch state(s). Instead of determining an individual value for the received signal or the variable derived therefrom for a switch state, thus a value range is ascertained for a switch state as a function of the at least one environmental parameter.

In this regard, it is advantageous that the first and/or second switching point(s) are selected in such a manner that the third and/or fourth values for the received signal or the variable derived from the received signal lie/lies outside of the first and/or second value range(s) corresponding to the first and/or second switch state(s). The first and/or second switching point(s) have thus, in each case, a predeterminable distance greater than zero from the first and second value ranges for the received signal or the variable derived therefrom. For example, the third value for the received signal or the variable derived therefrom is less than the fourth value for the received signal or the variable derived therefrom.

Correspondingly, the first switching point lies at a lower value than the second switching point. Then the third value for the received signal or the variable derived therefrom is selected such that this value is greater than a maximum value of the first value range of the first switch state. Likewise, the fourth value for the received signal or the variable derived therefrom is selected such that this value is less than a minimum value of the second value range of the second switch state.

Another preferred embodiment provides that the first and second switching points are selected in such a manner that the third and fourth values for the received signal or the variable derived from the received signal lie outside of the first and second value ranges corresponding to the first and second switch states.

Alternatively, or in case this is not possible, a preferred embodiment includes that, especially in case of a magnitude of a difference between a maximum value of the first value range corresponding to the first switch state and a minimum value of the second value range corresponding to the second switch state being less than the influence interval, the first or second switching point is selected in such a manner that the third or fourth value for the received signal or the variable derived from the received signal lies outside of the first or second value range corresponding to the first or second switching point.

It is with reference to the method of the invention advantageous that the sensor unit is free of medium in the first switch state.

It is likewise advantageous that the sensor unit is at least partially covered with medium in the second switch state.

Finally, it is advantageous that the first and/or second switching point correspond(s), in each case, to a predeterminable degree of coverage of the sensor unit.

The object underpinning the invention is likewise achieved by an apparatus, which is embodied to perform a method of the invention as defined in at least one of the embodiments described in connection with the method of the invention.

BRIEF DESCRIPTION OF THE DRAWINGS

The invention will now be explained in greater detail based on the appended drawing, the figures of which show as follows:

FIG. 3 shows a schematic view illustrating the determining of the two switch states and the influence interval (a) when a single switching point is determined, and (b) when two switching points are determined, and FIG. 4 shows different positions of the switch states and switching points taking into consideration the influence interval.

DETAILED DESCRIPTION

Figure 1:
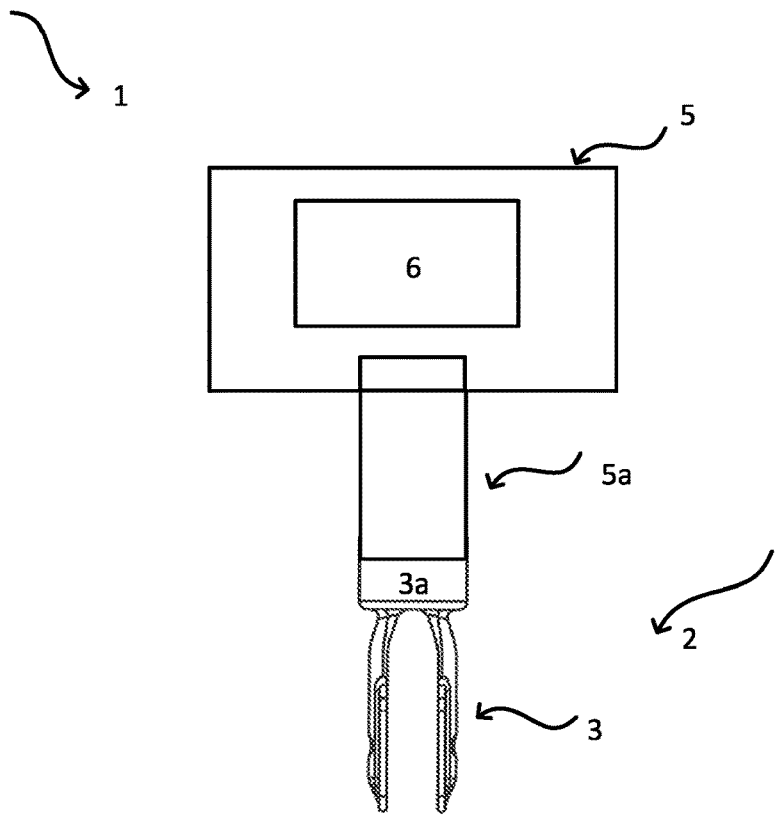
FIG. 1 shows a vibronic field device according to the state of the art.

In the figures, equal elements are provided with equal reference characters.

The present invention is applicable for all types of field devices 1 in the form of limit level switches. For purposes of simplification, the following description is, however, directed to the examples of a vibronic fill-level measuring device (FIG. 1) and a field device working according to the capacitive and/or conductive operating mode (FIG. 2), such as they are schematically shown in FIGS. 1 and 2.

FIG. 1 shows a vibronic fill-level measuring device 1 having a sensor unit 2 with an oscillatable unit 3. Fill-level measuring device 1 is suitable for registering a predetermined fill level, or for determining density and/or viscosity. Corresponding field devices are produced and sold by the applicant under the marks, LIQUIPHANT and SOLIPHANT. The relevant underpinning measuring principles are known from a large number of publications. Sensor unit 2 of the field device 1 includes a mechanically oscillatable unit 3 in the form of an oscillatory fork. The oscillatable unit is excited by a driving/receiving unit 3a by means of an electrical excitation signal to cause the mechanically oscillatable unit to execute mechanical oscillations, especially with the resonant frequency of the oscillatory fork 3. Moreover, the driving/receiving unit 3a receives the mechanical oscillations of the oscillatable unit 3 and converts them into an electrical, received signal. The driving/receiving unit 3a is preferably composed of one or more piezoelectric elements. The reaching of a predetermined fill level can, in such case, be detected, for example, based on a change of the frequency of the oscillations of the mechanically oscillatable unit 3, as derived from the received signal received from the oscillatable unit 3. Sensor unit 2 is, in turn, connected by means of the neck tube 5a with an electronics unit 6, which is arranged in a field device housing 5. Shown here is, thus, an example of a field device 1 of compact construction, in the case of which the electronics unit 6 and the sensor unit 2 are arranged together.

Figure 2:
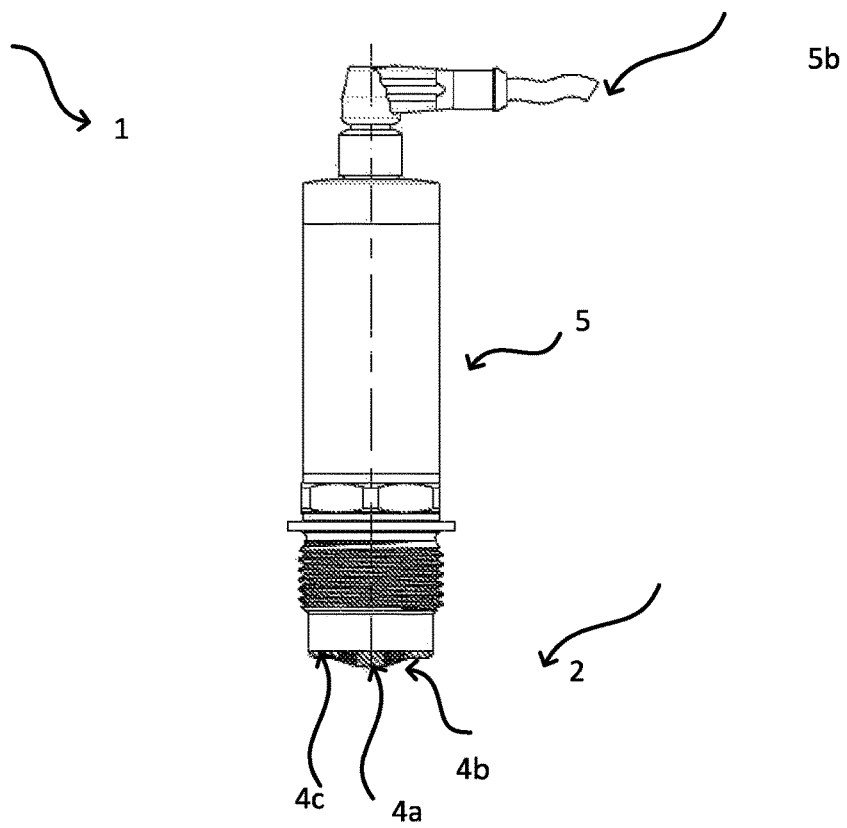
FIG. 2 shows a field device according to the state of the art working according to a capacitive and/or conductive operating mode.

A limit level switch working according to the capacitive and/or conductive measuring method is shown in FIG. 2. The capacitive measuring principle and the conductive measuring principle are likewise known per se in the state of the art. Corresponding field devices are produced and sold by the applicant, for example, under the mark, LIQUIPOINT. The field device 1 of FIG. 2 includes a sensor unit 2, which, when the field device 1 is introduced into a container, essentially front-flushly seals with the container. Sensor unit 2 is essentially coaxially constructed and includes a measuring electrode 4a, a guard electrode 4b and a ground electrode 4c. The housing 5 of the field device 1 in the illustrated embodiment includes, furthermore, a socket for a connecting plug 5b.

In the case of the limit level switch 1 of FIG. 2, thus, the electronics 6 is arranged separately from the sensor unit 2.

FIG. 3 illustrates the determining of the first switch state $S_1$ and the second switch state $S_2$ according to the invention for a limit level switch as well as for determining a first switching point $P_1$ (FIG. 3a), and a first switching point $P_1$ and second switching point $P_2$ (FIG. 3b), taking into considering an influence interval $\Delta E$.

First, an influence interval $\Delta E(U)$ for a signal received $E(F,U)$ received by the sensor unit 2 as a function of at least one environmental parameter U is ascertained. The received signal E is, in such case, a function of fill level F and the environmental parameter U. According to the invention, the influence of the environmental parameter should be reduced or eliminated based on the influence interval $\Delta E(U)$, or of the influence interval $\Delta E(U)$. The influence interval can be determined once for a certain type of limit level switch 1 or for each individual limit level switch 1, for example, by determining the received signal $E(F,U)$ as a function of a predeterminable value range for the environmental parameter U, within which the measuring device 1 is applied in ongoing operation.

Moreover, a first value $E_1$ is determined for the received signal E or for a variable derived from the received signal corresponding to a first switch state $S_1$, at which value the sensor unit 2 is located in a first state. Likewise, a second value $E_2$ is determined for the received signal E or for a variable derived from the received signal corresponding to a second switch state $S_2$, at which value the sensor unit 2 is located in a second state. In the present case, the sensor unit 2 in the first switch state $S_1$ is free of medium, i.e. the current fill level F is such that the sensor unit 2 is free of medium M. In the second switch state $S_2$, the sensor unit 2 is, in contrast, completely covered with the medium M. For the embodiment in FIG. 3a, as well as for all subsequent embodiments, the influence interval $\Delta E(U)$ lies, in each case, symmetrically around the first switching point S1 and the second switching point S2. Such an arrangement of the influence interval $\Delta E(U)$ relative to the switching points $S_1$ and $S_2$ is, however, not absolutely necessary in the context of the present invention.

It is, furthermore, also an option to determine for the first switch state $S_1$ and/or the second switch state $S_2$, in each case, corresponding value ranges $\Delta E_1$ and/or $\Delta E_2$ for the received signal E or the variable derived therefrom, which ranges include the first value $E_1$ and the second value $E_2$ for the received signal E or the variable derived therefrom.

Finally, at least a third value $E_3$ is determined for the received signal E or for a variable derived from the received signal E corresponding to a first switching point $P_1$ based on the first switch state $S_1$ and/or second switch state $S_2$ and taking into consideration the at least one influence interval $\Delta E(U)$. Preferably, such as shown in the case of FIG. 3a, the switching point $P_1$ is selected in such a manner that it lies outside of the influence intervals $\Delta E(U)$ of the first switch state $S_1$ and second switch state $S_2$.

FIG. 3b shows supplementally to the first switching point $P_1$ a second switching point $P_2$. Corresponding to this second switching point $P_2$ is a fourth value $E_4$ for the received signal E or a variable derived therefrom. The two switching points $P_1$ and $P_2$ define a switching point-hysteresis loop with a predeterminable switching interval $\Delta P$. The switching interval $\Delta P$ is, in such case, given by the magnitude of the difference between the third value $E_3$ and the fourth value $E_4$ for the received signal E or the variable derived from the received signal E.

Both the first switching point $P_1$ as well as also the second switching point $P_2$ are selected in such a manner that they lie between the values $E_1$ and $E_2$ for the received signal E or the variable derived therefrom corresponding to the first switch state $S_1$ and second switch state $S_2$. The third value $E_3$ for the received signal E has thus a first distance $d_1$ from a maximum value $E_{1,max}$ of the first value range $\Delta E_1$, while the fourth value $E_4$ for the received signal E has a second distance $d_2$ from a minimum value $E_{2,min}$ of the second value range $\Delta E_2$, wherein $d_1, d_2 > 0$. The distances $d_1$ and $d_2$ can, in such case, be equally large or different.

Preferably, however, not absolutely, the switching interval $\Delta P$ is furthermore selected to be as large as possible, especially greater than the influence interval $\Delta E(U)$.

The embodiment shown in FIG. 3b shows, in principle, the ideal case for an embodiment with two switching points $P_1$ and $P_2$. In some cases, it can occur that the switching points $P_1$ and $P_2$ cannot be selected such that the switching interval $\Delta P$ is greater than the influence interval $\Delta E(U)$. Furthermore, it can also not always be assured that the third value $E_3$ for the received signal E has a first distance $d_1$ from a maximum value $E_{1,max}$ of the first value range $\Delta E_1$ and the fourth value $E_4$ for the received signal E has a second distance $d_2$ from a minimum value $E_2$,min of the second value range $\Delta E_2$.

FIG. 4 shows, by way of example, three cases, which occur, when it is not possible to determine all parameters of the field device 1 according to the described ideal case.

FIG. 4a shows a schematic view of a first case, wherein the distance $d_1$ between the third value $E_3$ for the received signal E and the maximum value $E_{1,max}$ of the first value range is $\Delta E_1 < 0$. In such case, there is a critical region $k_1$, in which an unintended switching or non-switching as a result of the environmental parameter U can occur. A similar case is shown in FIG. 4b. In such case, the distance $d_2$ between the fourth value $E_4$ for the received signal E and the minimum value $E_{2,min}$ of the second value range is $\Delta_{E1} < 0$. In such case, there is a critical region $k_2$, in which an unintended switching or non-switching as a result of the environmental parameter U can occur. In the worst case, as shown in FIG. 4c, both $d_1$ as well as also $d_2$ are <0, so that the two critical regions $k_1$ and $k_2$ occur simultaneously.

According to the invention, the switching point $P_1$ or the switching points $P_1$ and $P_2$ preferably is/are selected in such a manner that an embodiment as shown in FIG. 3b is created. For example, for this purpose, the switching interval $\Delta P$ can be lessened, in case one of the distances $d_1$ or $d_2$ is <0. Advantageously by means of the present invention, an error-free switching of the measuring device 1 can be assured in simple manner, independently of the at least one environmental parameter U.

The invention claimed is:

1. A method for parametering an apparatus for determining and/or monitoring a predeterminable fill level, wherein the apparatus includes a sensor unit and an electronics, the method comprising:

determining an influence interval for a received signal received by the sensor unit as a function of an environmental parameter, wherein the influence interval is a range of variation of the received signal as a function of the environmental parameter;

determining a first value for the received signal or for a variable derived from the received signal corresponding to a first switch state at which value the sensor unit is located in a first state;

determining a second value for the received signal or for the variable derived from the received signal corresponding to a second switch state at which value the sensor unit is located in a second state;

determining a third value for the received signal or for the variable derived from the received signal corresponding to a first switching point based on the first and second switch state and taking into consideration the influence interval, wherein the third value lies between the first value and the second value for the received signal or the variable derived from the received signal; and determining a fourth value for the received signal or for the variable derived from the received signal corresponding to a second switching point based on the first switch state and the second switch state and taking into consideration the influence interval, wherein the fourth value lies between the first value and the second value for the received signal or the variable derived from the received signal and wherein the fourth value lies above the third value, wherein the first switching point and the second switching point define a switching point hysteresis loop having a predeterminable switching interval having a magnitude that is a difference between the third value and the fourth value for the received signal or the variable derived from the received signal.

2. The method as claimed in claim 1, wherein the environmental parameter is temperature, pressure, humidity, density, or viscosity.

3. The method as claimed in claim 1, further comprising:

placing the influence interval symmetrically around the first switch state and the first value for the received signal or for the variable derived therefrom and symmetrically around the second switch state and the second value for the received signal or for the variable derived therefrom.

4. The method as claimed in claim 1, further comprising:

maximizing the predeterminable switching interval taking into consideration the first switch state and the second switch state and the influence interval.

5. The method as claimed in claim 1, wherein the predeterminable switching interval is selected such that the switching interval is greater than the influence interval.

6. The method as claimed in claim 1, further comprising:

ascertaining for the received signal or for the variable derived from the received signal based on the influence interval a first value range and a second value range that contain the first value and the second value, respectively of the received signal or the variable derived from the received signal, wherein the first value range and the second value range correspond to the first switch state and the second switch state, respectively.

7. The method as claimed in claim 6, wherein the third value and the fourth value for the received signal or the variable derived from the received signal lie outside of the first value range and the second value range corresponding to the first switch state and the second switch state, respectively.

8. The method as claimed in claim 6, wherein in the case of a magnitude of a difference between a maximum value of the first value range corresponding to the first switch state and a minimum value of the second value range corresponding to the second switch state being less than the influence interval, the first or second switching point is selected such that the third or fourth value for the received signal or the variable derived from the received signal lies outside of the first value range and/or second value range corresponding to the first and/or second switch state.

9. The method as claimed in claim 1, wherein the sensor unit is free of medium in the first switch state.

10. The method as claimed in claim 1, wherein the sensor unit is covered at least partially with medium in the second switch state.

11. The method as claimed in claim 1, wherein the first switching point and/or second switching point correspond/corresponds to a predeterminable degree of coverage of the sensor unit.

12. The method as claimed in claim 1, wherein the determining of the influence interval includes:

ascertaining a dependence of the received signal on the environmental parameter and determining from the dependence a value range of the received signal; and determining the influence interval based on the value range of the received signal.

* * * * *